US012545459B2

(12) United States Patent
Biondi et al.

(10) Patent No.: US 12,545,459 B2
(45) Date of Patent: Feb. 10, 2026

(54) APPARATUS AND PROCESS FOR SHAPING A BOX BY WRAPPING-AROUND

(71) Applicant: R.A JONES & CO., Covington, KY (US)

(72) Inventors: Andrea Biondi, Bologna (IT); Luca Cavazza, Bologna (IT); Ivanoe Bertuzzi, Bologna (IT); Enrico Campagnoli, Bologna (IT); Marco Ghini, Bologna (IT); Luca Borderi, Bologna (IT)

(73) Assignee: R.A JONES & CO., Covington, KY (US)

( * ) Notice: Subject to any disclaimer, the term of this patent is extended or adjusted under 35 U.S.C. 154(b) by 0 days.

(21) Appl. No.: 18/711,395

(22) PCT Filed: Nov. 22, 2022

(86) PCT No.: PCT/IB2022/061297
§ 371 (c)(1),
(2) Date: May 17, 2024

(87) PCT Pub. No.: WO2023/094997
PCT Pub. Date: Jun. 1, 2023

(65) Prior Publication Data
US 2025/0019107 A1 Jan. 16, 2025

(30) Foreign Application Priority Data
Nov. 24, 2021 (IT) ........................ 102021000029756

(51) Int. Cl.
*B65B 11/00* (2006.01)
*B31B 50/32* (2017.01)
(Continued)

(52) U.S. Cl.
CPC ............ *B65B 49/02* (2013.01); *B31B 50/322* (2017.08); *B65B 5/024* (2013.01); *B65B 11/004* (2013.01);
(Continued)

(58) Field of Classification Search
CPC ......... B65B 5/024; B65B 11/04; B65B 41/06; B65B 43/46; B65B 43/50; B65B 49/02;
(Continued)

(56) References Cited

U.S. PATENT DOCUMENTS 1,875,986 A * 9/1932 Bronander .............. B65B 19/24 53/575
2,059,416 A * 11/1936 Thom ..................... B31B 50/00 493/128
(Continued)

FOREIGN PATENT DOCUMENTS

EP 0064709 B1 * 3/1982 .............. B65B 5/06
IT 20010518 A1 2/2003
(Continued)

OTHER PUBLICATIONS

International Search Report and Written Opinion issued for International Patent Application No. PCT/IB2022/061297 filed on Nov. 22, 2022 on behalf of R.A Jones & CO. Mail Date: Mar. 3, 2023. 11 pages.

*Primary Examiner* — Joshua G Kotis
(74) *Attorney, Agent, or Firm* — Steinfl + Bruno LLP

(57) ABSTRACT

An apparatus for shaping a box by wrapping-around includes a shaping device with a carousel, on which shaping supports are circulated along a closed circular trajectory. A portion of the trajectory constitutes a box shaping path. The carousel rotates around a vertical axis of rotation with a continuous motion. The shaping supports are adapted to receive products to be packaged. The apparatus also includes
(Continued)

a dispenser device of blanks intended to be wrapped around to contain the products to be packaged. The apparatus includes a transfer device of blanks, apt to sequentially pick-up the blanks and insert them, one at a time, into the shaping path. A process for shaping boxes by wrapping-around is also described.

14 Claims, 5 Drawing Sheets

(51) Int. Cl.

| | |
|---|---|
| ***B65B 5/02*** | (2006.01) |
| ***B65B 43/14*** | (2006.01) |
| ***B65B 43/18*** | (2006.01) |
| ***B65B 43/46*** | (2006.01) |
| ***B65B 49/02*** | (2006.01) |

(52) U.S. Cl.
CPC .......... *B65B 43/145* (2013.01); *B65B 43/185* (2013.01); *B65B 43/46* (2013.01); *B65B 2220/18* (2013.01)

(58) Field of Classification Search
CPC . B65B 2220/18; B65B 11/004; B65B 43/185; B65B 43/126; B31B 50/322; B31B 50/324; B31B 50/326; B31B 50/747; B31B 50/788
See application file for complete search history.

(56) References Cited

U.S. PATENT DOCUMENTS

| | | | | | |
|---|---|---|---|---|---|
| 2,176,147 | A * | 10/1939 | Palmer | B65B 1/02 53/377.2 |
| 2,412,370 | A * | 12/1946 | Tascher | B65B 5/024 53/542 |
| 3,029,572 | A * | 4/1962 | Jackson | B65B 19/24 53/208 |
| 3,373,663 | A * | 3/1968 | Heim | B31B 50/00 53/563 |
| 3,435,735 | A * | 4/1969 | Whitaker | B65B 19/24 493/205 |
| 3,507,088 | A * | 4/1970 | Gillespie | B65B 11/12 53/496 |
| 3,875,724 | A * | 4/1975 | Langen | B65B 11/004 53/462 |
| 3,879,920 | A | 4/1975 | Langen | |
| 3,935,694 | A * | 2/1976 | Langen | B65B 49/02 493/131 |
| 4,481,752 | A * | 11/1984 | Sabel | B65B 5/06 53/448 |
| 4,548,019 | A * | 10/1985 | Kruse | B65B 19/24 53/170 |
| 4,718,882 | A * | 1/1988 | Bressler | B31B 50/00 53/565 |
| 4,999,970 | A * | 3/1991 | Bamrungbhuet | B65B 19/225 53/225 |
| 5,027,585 | A * | 7/1991 | Russell | B65B 3/025 53/565 |
| 5,120,292 | A * | 6/1992 | Ueda | B31B 50/322 493/134 |
| 7,001,320 | B1 * | 2/2006 | Focke | B65B 43/24 493/426 |
| 2004/0000121 | A1 * | 1/2004 | Ichikawa | B65B 5/06 53/238 |
| 2004/0023768 | A1 * | 2/2004 | Jaen | B31B 50/00 493/55 |
| 2004/0261368 | A1 * | 12/2004 | Focke | B65B 19/18 53/449 |
| 2020/0010226 | A1 * | 1/2020 | Draghetti | B29C 66/8432 |
| 2023/0173781 | A1 * | 6/2023 | Carboni | B65B 51/023 493/128 |
| 2025/0002188 | A1 * | 1/2025 | Biondi | B65B 5/04 |
| 2025/0002191 | A1 | 1/2025 | Biondi et al. | |
| 2025/0019104 | A1 | 1/2025 | Biondi et al. | |
| 2025/0033814 | A1 | 1/2025 | Biondi et al. | |
| 2025/0058917 | A1 * | 2/2025 | Biondi | B65B 51/02 |

FOREIGN PATENT DOCUMENTS

| | | |
|---|---|---|
| IT | 202100029759 | 11/2021 |
| IT | 202100029762 | 11/2021 |
| IT | 202100029765 | 11/2021 |
| IT | 202100029750 A1 | 5/2023 |
| IT | 202100029753 A1 | 5/2023 |
| WO | 2020/089754 A1 | 5/2020 |

* cited by examiner

APPARATUS AND PROCESS FOR SHAPING A BOX BY WRAPPING-AROUND

CROSS-REFERENCE TO RELATED APPLICATIONS

The present application is the U.S. National Stage of International Patent Application No. PCT/IB2022/061297 filed on Nov. 22, 2022, which, in turn, claims priority to Italian Patent Application No. 10202100029756 filed Nov. 24, 2021.

The present invention relates to an apparatus and process for shaping a box by wrapping around.

The content of the following Patent Applications, by the Applicant is considered as herein fully incorporated:

Italian Patent Application No. 102021000029750 dated 24 Nov. 2021 titled "Metodo di confezionamento di articoli in scatole e dispositivo di confezionamento operante secondo tale metodo";

Italian Patent Application No. 102021000029753 dated 24 Nov. 2021 titled "Metodo di confezionamento di articoli in scatole e dispositivo di confezionamento operante secondo tale metodo";

Italian Patent Application No. 102021000029756 titled "Apparato e processo per la formazione in avvolgimento di una scatola";

Italian Patent Application No. 102021000029759 dated 24 Nov. 2021 titled "Processo e Apparato per la formazione in avvolgimento di una scatola";

Italian Patent Application No. 102021000029762 dated 24 Nov. 2021 titled "Dispositivo e metodo per il confezionamento di articoli in scatole"; and Italian Patent Application No. 102021000029765 dated 24 Nov. 2021 titled "Metodo per operare su prodotti".

The present invention applies to the field of packaging articles in box-shaped packages with a predefined shape, which may be obtained by folding and fastening the flaps by wrapping a blank around a content of any type and shape.

By way of merely exemplary purposes, the present invention applies, though non-exclusively, to the field of packaging loose or granular products in flexible pouches or bags, which shape is affected not only by the shape of the pouch or bag, but also by the amount and arrangement of the product contained. In principle the content of the flexible pouch could therefore relate to any product having an undefined shape, and it could therefore be liquid, or have a creamy or paste consistency.

More specifically, non-exclusive examples of the aforesaid application may be found in the food industry, for packaging food in powder, granulated, and particulate form composed of discrete elements.

A non-exclusive example of use is represented by the packaging of products derived from flaked or granule cereals, also known as corn-flakes, which are usually marketed as breakfast products. They are generally made available in a box-shaped packaging which in turn contains a pouch made of flexible material that meets the specific packaging requirements of the product.

Hereinafter, reference will be made to this particular field, without losing generality.

In particular, in the relevant technical field, they are known packaging processes and apparatuses in which the box is obtained from a blank that is wrapped around the product to be packaged.

In this type of process, the product to be packaged is transported along a transport line, with a separating space between successive contents, a space that is exploited to insert a blank between the products that is wrapped around the target product, and is subsequently sealed, e.g. by gluing operations.

On the one hand, it is understood that, in order to increase the productivity of such a packaging apparatus, it may be envisaged to increase the transport speed of the content on the respective transport line. However, the increased speed might require a greater spacing between products, which in turn would increase the overall size of the packaging machine.

On the other hand, an increase in the dimensions of the apparatus would make the operations required to shape the box difficult, as they require a high level of care and precision.

In fact, both the higher transport speeds and an increase in the mechanical clearance in the transport systems could affect the accuracy of the result obtained, particularly concerning the final shape of the box.

In other words, it is required that an increase in the productivity required by a packaging plant does not imply an increase in the size of the packaging apparatus in relation to the higher transport speeds that would be employed.

By contrast, a reduction in size and a greater flexibility in terms of both speed and types of product that may be packaged, or types of boxes to be obtained by wrapping-around, appear to the Applicant as desirable objects.

In the present disclosure, as well as in the accompanying claims, certain terms and expressions are deemed to have, unless otherwise expressly indicated, the meaning expressed in the following definitions.

"Box" refers to a package formed by substantially rigid walls and provided with a predefined shape, for exemplary purposes a square shape, i.e. with pairs of walls parallel to each other.

"Product" or "product to be packaged" refers to an assembly, consisting of one or more articles to be packaged, intended to be packaged inside a box that is shaped by wrapping around that assembly.

"Packaging" of one or more articles in a box means obtaining a box containing said one or more articles. Such packaging may be obtained by introducing one or more articles in an already shaped box or, preferably, may be obtained by shaping a box around the one or more articles to be contained.

"Pouch" refers to a specific type of content, i.e. the flexible portion of the final packaging, already filled with its relevant product, in a predetermined amount, and already sealed. Such a product will be a loose product, hence without a form of its own, provided in a liquid or paste form, in powder, granules, discrete particles and the like, the form of which is at least to some extent variable and affected by the conditions of transport, the position of the product inside the pouch, the form of a respective rigid container and the inertial effects to which the contents and the product are subjected.

Such pouches, or one or more thereof, and other ancillary articles may constitute the product to be packaged, which in any case is not limited to this example.

"Blank" refers to a flat element, suitably die-cut, from which, by means of operations of folding and fixing the flaps, a box is obtained, i.e. a shaped sheet with a suitable material and thickness that is adapted to be wrapped by means of folding around a mandrel to shape a box.

"Shaping device" refers to a device in which the step of wrapping-around the blank and shaping the box around the respective content takes place.

"Carousel" refers to an apparatus wherein a plurality of equipment rotate about a vertical axis, possibly mounted on a rotating drum or other mechanism which make the equipment perform a closed trajectory, in particular a substantially circular trajectory; wherein each piece of equipment, at each turn, receives one or more inlet articles, performs specific operations on said one or more articles, possibly modifying their configuration, and produces an output with said one or more modified articles.

"Blank dispenser device" refers to a device that provides, into the aforesaid shaping device, individual blanks, each of which is intended to shape a box.

"Blank transfer device" refers to a device that picks up the blanks and inserts them, one at a time, into the shaping device, so that the step of wrapping-around leading to shaping the box is carried out.

"Shaping by wrapping-around" refers to a step of shaping a box which is performed by wrapping-around a flat blank, for exemplary purposes made of cardboard or chipboard, and in any case suitable for obtaining a box, around the content to be packaged, which in turn may be laid on a shaping support.

"Shaping support" refers to a support, which may in particular be of the movable type, that ensures that the content is held in a predetermined position during the step of shaping by wrapping-around.

"Mandrel" or "wrapping mandrel" refers to a special shaping support that, at least to a certain extent, wraps the content to be packaged around, and has rigid, pre-determinedly positioned, abutment elements around which the box is wrapped in such a way that its walls assume a pre-determined position.

"Shaping path" refers to the trajectories performed by the content to be packaged as the box is shaped by wrapping around the content itself.

"Shaping plane" refers to a transport system that creates a plane on which the content to be packaged is laid and on which the box is shaped by wrapping around the content.

The Applicant noted that the transfer speed of the contents to be packaged during their packaging process is crucial for the overall process economy, as high production volumes may be achieved with fewer packaging apparatuses.

Furthermore, the Applicant noted that, in addition to the need to proceed with the highest possible speed, another important and unavoidable requirement is the precision in shaping the box, which requires synchrony between the different moving parts of the packaging apparatus, a synchrony that must be maintained unaltered at any shaping and transport speed.

The Applicant also verified that the increase in the aforesaid transport speeds, and in general an increase in the required productivity of the packaging plant, could lead to a corresponding increase in the size and complexity of the packaging apparatus.

The Applicant then noted in particular the need to reduce the overall size of the packaging apparatuses, as greater dimensions and greater complexity may negatively affect the quality of the final product, i.e. the quality of the box assembled around the product to be packaged.

However, the Applicant noted that the size reduction may be implemented with special expedients, which still allow for high transport speeds, without nullifying the final result of the packaging process.

The Applicant also realised that the aforesaid expedients may relate to the structure of the transport and box-shaping paths, which may be selected both to achieve a reduction in the overall size and to increase the flexibility of the plant, should the need arise to assemble a series of different boxes by wrapping-around in the same packaging apparatus.

The Applicant therefore perceived that the use of a carousel with a vertical axis of rotation, which performs a box-shaping path extending on a substantially circular and non-linear trajectory, providing for substantial co-planarity in the different steps of transferring the content and the box from one step of the packaging process to another, may reduce the size of the apparatus and allow for a wide flexibility of operation.

Finally, the Applicant found that the use of shaping supports, which travel along said circular trajectory in said carousel, and which first receive the products to be packaged and then the blank which wraps around the support and product, may represent an optimal solution to obtain a consistent reduction in size and to maintain and increase the flexibility of operation of the apparatus upon variations in the productivity required and in the type of boxes to be assembled.

In particular, the invention, in a first aspect thereof, relates to an apparatus for shaping a box by wrapping-around.

Preferably, such an apparatus comprises a shaping device comprising a carousel, on which one or more shaping supports are made to circulate along a closed circular trajectory.

Preferably, a portion of said closed circular trajectory constitutes a shaping path of said box.

Preferably, in said apparatus, the carousel rotates about a vertical axis of rotation with a continuous motion, said shaping supports being adapted to receiving products to be packaged.

Preferably, the aforesaid packaging apparatus further comprises a device for dispensing blanks intended to be wrapped so as to contain said products to be packaged.

Preferably, such a blank has an inner face, adapted to form, when the box is shaped, the inner surface of the box, and an outer face.

Preferably, the aforesaid packaging apparatus also comprises a blank transfer device that is adapted to sequentially pick up the blanks and insert them, one at a time, into said shaping path.

This insertion operation is carried out in such a way that a respective shaping support intercepts a blank, engaging its inner face, at a position intersecting the shaping path.

Thanks to these characteristics, the shaping of the box takes place within a carousel, engaging only a portion of the closed circular trajectory it determines. Once completed a first step of shaping the box, which involves assembling the panels in a wrapped-around configuration, it is extracted from the shaping support together with the product to be packaged, while the shaping support continues in the closed trajectory, thus being able to receive a new product to be packaged and a subsequent blank to be wrapped.

It will also be noted that this solution, still thanks to the aforementioned characteristics, is applicable to a very wide range of products to be packaged and an equally wide range of boxes that may be obtained by wrapping-around.

The invention, in a second aspect thereof, relates to a process for shaping a box by wrapping-around, in which a blank is wrapped around a content to be packaged.

Preferably, the aforesaid process comprises a step wherein one or more shaping supports of said box are provided in the process, such shaping supports being adapted to receive one or more products to be packaged.

Preferably, the shaping supports move continuously on an annular path wherein, on a portion thereof, a box-shaping path is obtained.

Preferably, the aforesaid process then comprises a step wherein said one or more products to be packaged are transferred onto a respective shaping support.

Preferably, the aforesaid process still comprises a step wherein a blank is inserted into the box shaping path after said one or more products to be packaged have been transferred into it.

Preferably, said insertion takes place in such a way that the shaping path interferes perpendicularly with one inner face thereof.

Preferably, the aforesaid process finally comprises a step wherein said blank is wrapped around said one or more products to be packaged, making a box.

In other words, shaping the box in a closed annular path limits the size of the path dimensions, i.e. of the carousel on which this path is formed, but allows a great flexibility in terms of both the product to be packaged and the box to be wrapped.

In at least one of the aforesaid aspects, the present solution may also comprise at least one of the following preferred characteristics.

Preferably, the shaping path is arranged on a substantially horizontal shaping plane, and the blank, at the position intersecting the shaping path, is retained in a vertical position.

It is thereby possible to position the impact area of the blank with the shaping support by simply selecting the height of the blank from the ground.

Preferably, said blank is picked-up from a magazine in a vertical position, and from it the blank travels along a curvilinear path wherein one inner face thereof is exposed on the extrados of said curvilinear path.

This allows to carry out measurements and operations on the inner face of the blank, such as the deposition of glue or a possible reading of codes reported thereon.

Preferably, at the end of said curvilinear path, the blank is rotated so that said inner face is substantially perpendicular to the shaping path when the blank is inserted into it.

This simplifies the insertion and optimally positions the blank in relation to the impact with the shaping support.

Preferably, in the aforesaid apparatus, said blank transfer device comprises a rotating head, arranged on the top of a vertical axis rotating shaft, comprising one or more arms extending from said rotating head, which are made to revolve around by it.

Preferably, each arm comprises a gripping element that grasps, from a magazine, a respective blank comprising an outer face, on which said gripping element acts, and an inner face.

Preferably, in said blank transfer device, the gripping element revolves around a vertical axis with respect to said arm, to insert the blank into the shaping path.

This substantially carousel structure of the blank transfer device allows to further reduce the size by placing such device adjacent to the carousel shaping device.

Preferably, an adhesive material deposition member is provided on the inner face of said blank transfer device, arranged between said magazine and said position intersecting the shaping path.

This allows to insert a blank in the shaping path, which, in order to obtain the box by wrapping-around, only requires further folding operations.

Preferably, the shaping device comprises a fixed pocket, which has an inlet end and an outlet end that are both open, traversed by said shaping support to carry out the folding of the blank in a box by wrapping-around.

Preferably, the shaping device comprises a folding element, integral with said shaping support and made to revolve around by said carousel, movable from a retracted position to an operating position in which it interferes with a connecting flap of the blank, bending it.

Both the pocket and the folding element are arranged along the portion of closed circular trajectory that constitutes the shaping path of said box.

Preferably, the shaping support comprises at least one pushing element that acts on said one or more products to be packaged to position them in the middle of the shaping support, compensating for any positioning errors that the inertia of the product, with its insertion into a curved path, might have caused.

Preferably, the shaping support comprises a wrapping-around mandrel, which is extracted from at least one open end of said box, once it has been wrapped-around, at the end of said shaping path, thus ensuring that the blank is wrapped around a well-defined shaped die.

Preferably, the wrapping-around mandrel has two frame elements that are each extracted from one of the open ends of said box, once it has been wrapped around.

Thereby, the separation between the shaping support and the already wrapped-around and assembled box takes place by reducing any possible stress on the box and product, which remain in a predetermined position.

Preferably, said annular path, comprising said shaping plane, has a section wherein the support follows a path wherein, at the end of the shaping plane, it descends to a lower level and then ascends again to the level of the shaping plane at an inlet thereof.

At that ascend point, it receives the product to be packaged, while the transfer from the inlet transport plane to the shaping plane takes place on an inlet transfer plane coplanar to said inlet transport plane and shaping plane.

Such characteristic further minimises the consequences of the inertial effects resulting from inserting the product to be packaged in a curvilinear shaping path.

In this regard, in the apparatus, said shaping support comprises a mandrel lift mechanism that is made to revolve around by a carousel.

Thanks to this, when the support receives the respective content from an inlet transfer device, the lift mechanism lifts the mandrel to a shaping level corresponding to said shaping plane and, when the box is transferred to the outlet transfer device, it lowers said mandrel.

Preferably, said shaping support moves on the shaping floor at a predetermined shaping speed that is substantially constant.

In addition, it is slowed down at said ascent in order to couple with said content.

This choice makes it possible to minimise all accelerations that could affect the product to be packaged.

It must be specified that some steps of the method described above may be independent of the order of execution reported. In addition, some steps may be optional. Furthermore, some steps of the method may be performed repetitively, or they may be performed in series or parallel with other steps of the method.

The present solution will be hereinafter described according to a preferred embodiment thereof, provided for illustrative and non-limiting purposes with reference to the accompanying drawings in which.

Figure 1A:
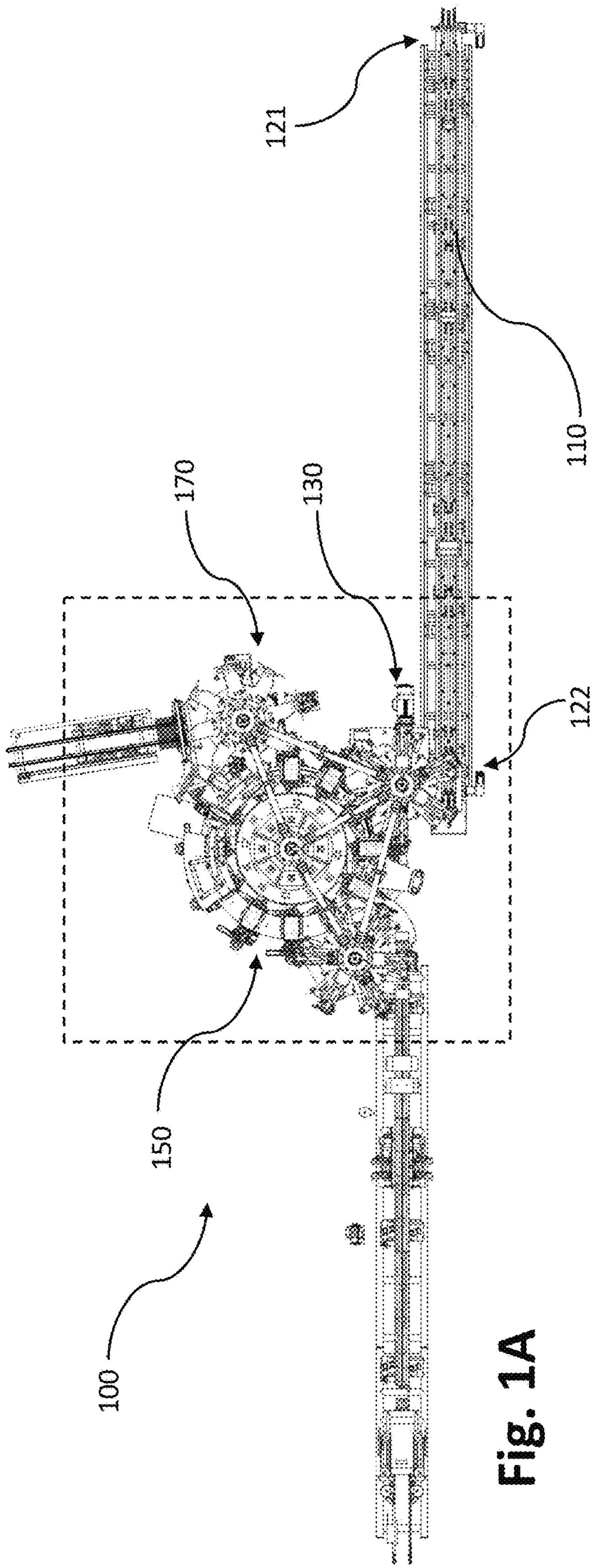
FIG. 1A shows an overall plan view of an embodiment of a packaging apparatus for shaping a box by wrapping-around.
Figure 1B:
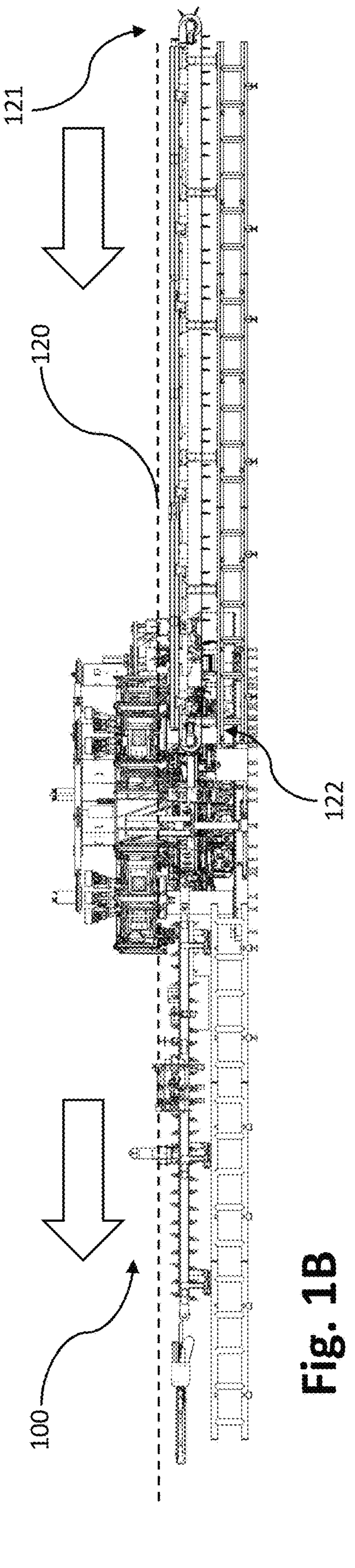
FIG. 1B shows an overall side view of the apparatus of FIG. 1A.
Figure 2:
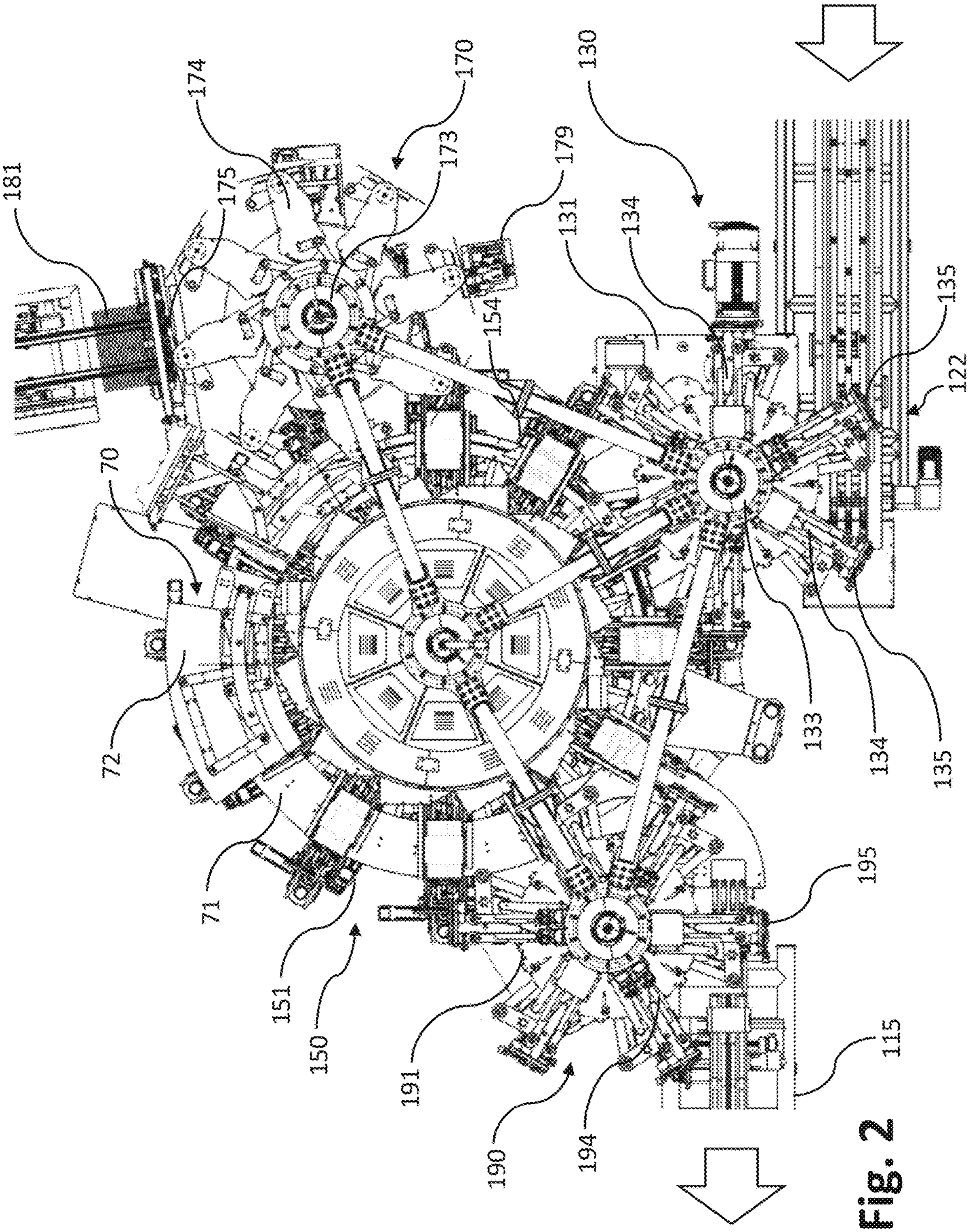
FIG. 2 shows a plan view of a portion of the apparatus of FIG. 1A, in which the step of shaping a box by wrapping-around takes place.
Figure 3:
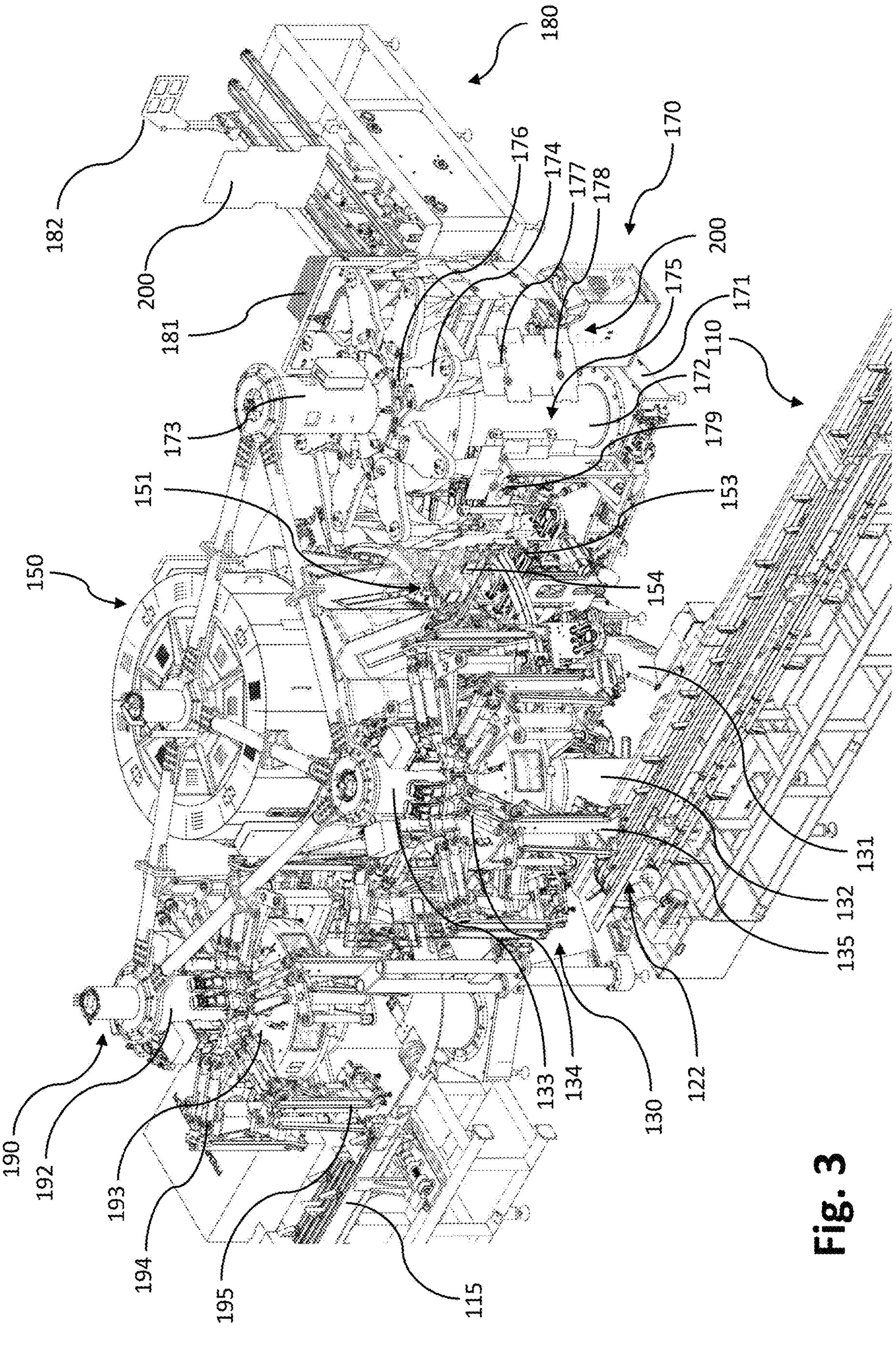
FIG. 3 shows a perspective view from a first point of view of the portion of the apparatus of FIG. 2.
Figure 5:
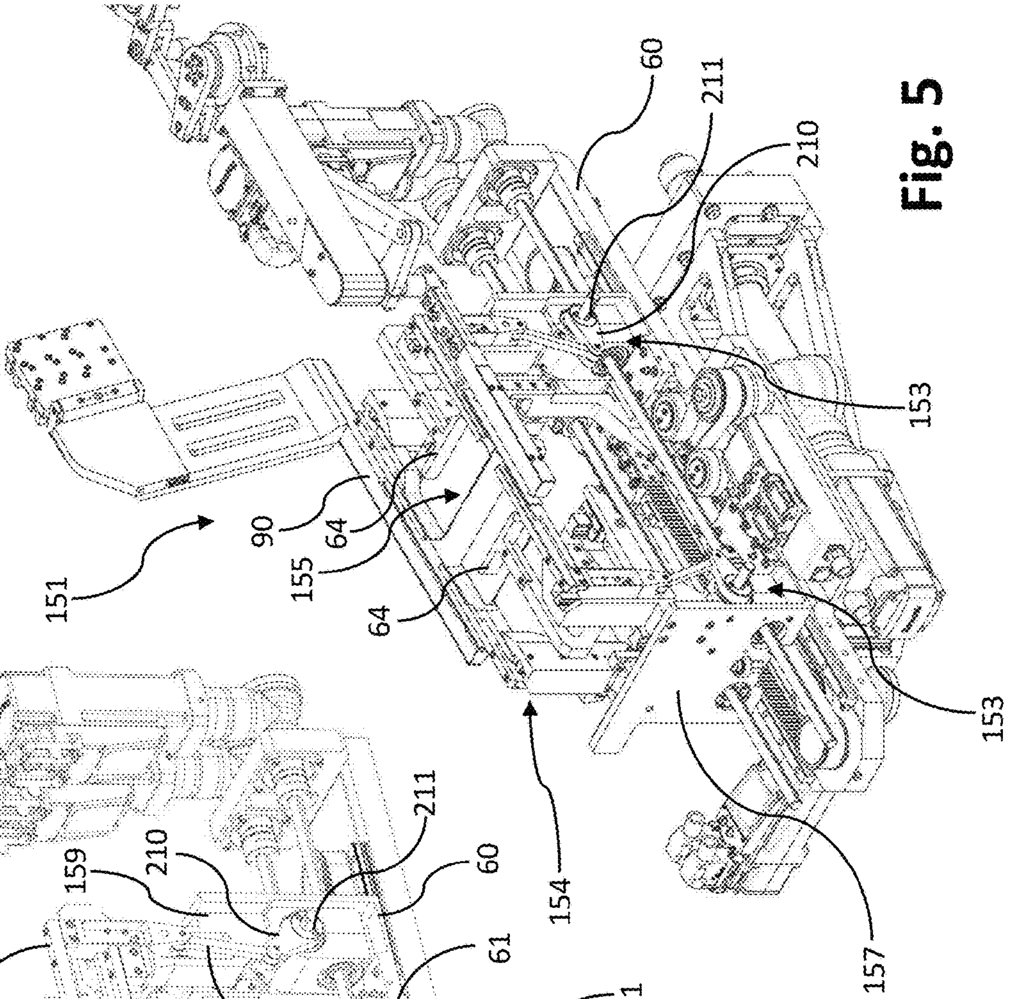
FIG. 5 shows a perspective view of the component of FIG. 4, from a different point of view and with more technical details.
Figure 4:
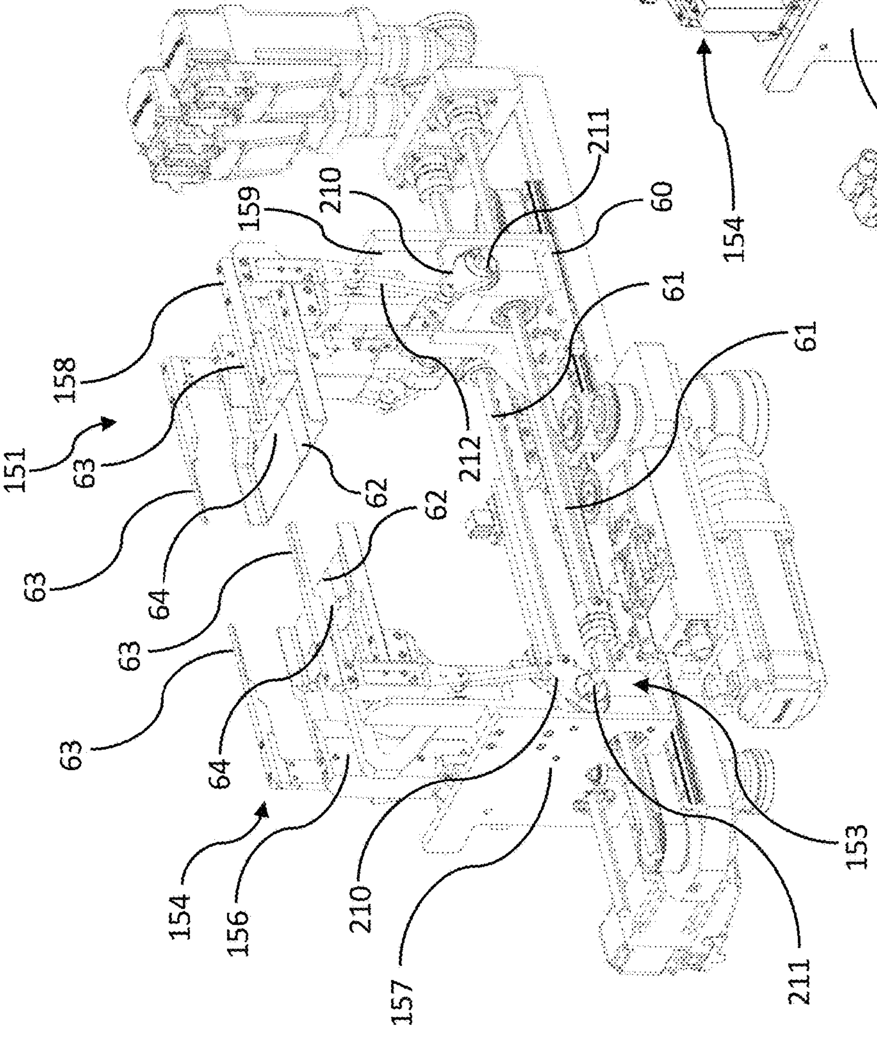
FIG. 4 shows a perspective view of a component of the portion of the apparatus of FIG. 2.
Figure 7:
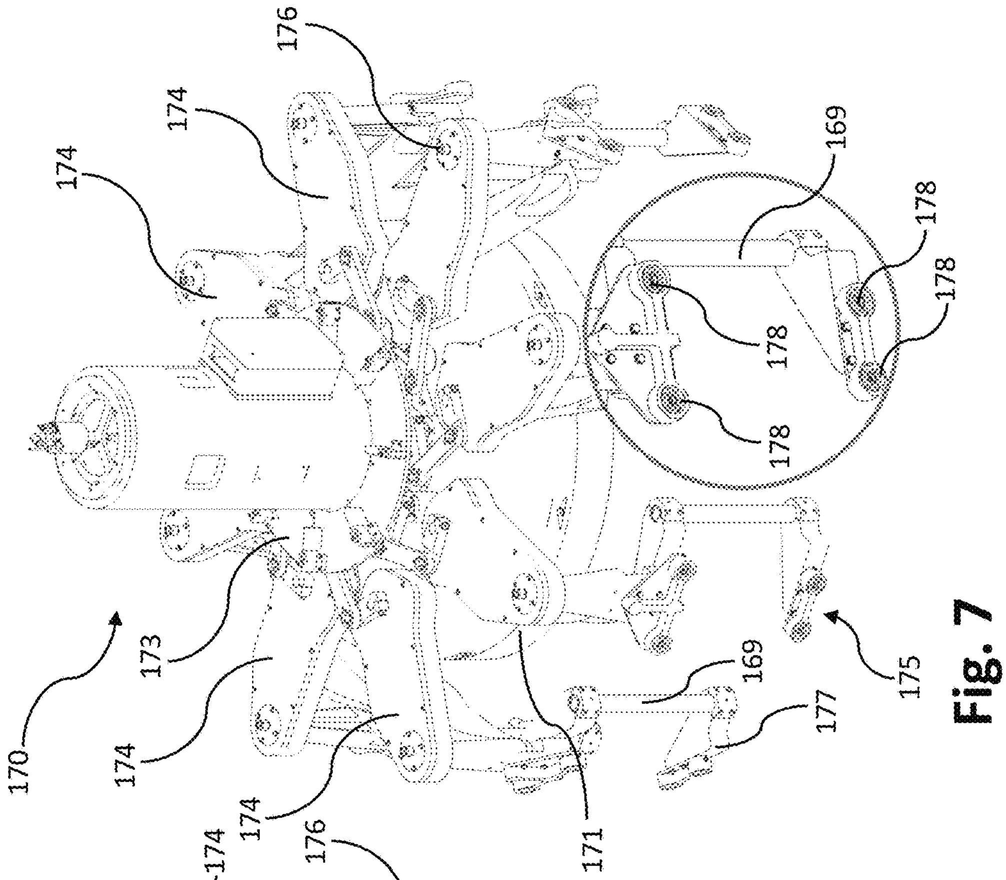
FIGS. 6 and 7 show a respective partial perspective view from above of a device for inserting box blanks in the portion of apparatus of FIG. 2, with (FIG. 6) and without (FIG. 7) the blanks.
Figure 6:
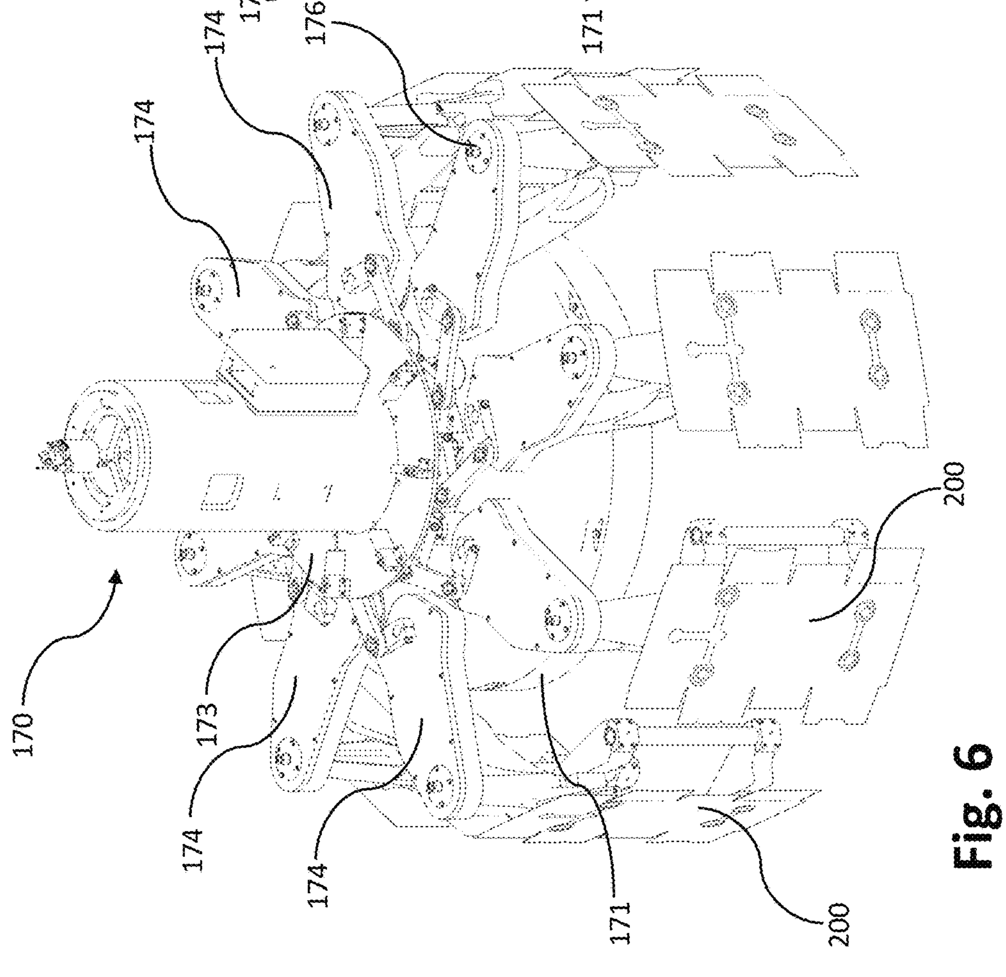

In the enclosed figures, number 100 globally denotes an apparatus for packaging articles to be packaged, i.e. in particular an apparatus for shaping a box by wrapping a box around a product to be packaged, which, in the present example, may consist of one or more flexible pouches, filled with predetermined amounts of products in the form of a discrete particulate consisting of granules and/or flakes and suitably sealed.

The apparatus 100 comprises a first transport device 110, consisting of a rectilinear conveyor belt on which the products to be packaged are conveyed, which in the present example consist of the above-described pouches, coming from the respective filling and sealing plant.

The first transport device 110 defines a transport plane 120, operating as an inlet transport plane on which the content to be packaged is laid, with the first transport device 110 conveying the content forward at a substantially constant speed on the inlet transport plane. Regarding the apparatus, the inlet transport plane defined in the first transport device 110 is arranged horizontally, and extends from a first loading end 121 of the first transport device 110 to a first unloading end 122 of the first transport device 110.

The aforesaid unloading end 122 is near, i.e. within range, of a first transfer device 130 which acts as an inlet transfer device: it is arranged to pick up a target product to be packaged, moving on the inlet transport plane 120, in order to transfer it from there to a shaping device, indicated as a whole by 150, wherein a step of wrapping a box around is provided.

The inlet transfer device 130 is structured as a carousel: it comprises a first base 131, a first upright 132 extending vertically from said base 131 and having, at its top, a first rotating element 133 substantially disc-shaped, from which respective first jointed transfer arms 134 branch off, which in turn have, on one of their respective distal operating ends, a first gripping device 135 which may be of the suction-cup, gripper or mixed type.

The first gripping devices 135 therefore move with a closed trajectory around the first shaft 132 thereof: such a trajectory is the result of performing this revolution motion with a rotating motion, around a vertical axis, imparted by the respective first arm 134, required to transfer the content to be packaged to the proper target position on the shaping device 150.

The transfer from the inlet transport plane 120 to a subsequent shaping plane, which will be described hereinafter, is therefore carried out by moving the product to be packaged onto a single inlet transfer plane, which is arranged horizontally and which is, in particular, coplanar to the inlet transport plane 120.

In this step of transferring and depositing the product, the shaping device 150 is in an enlarged configuration to facilitate positioning the product. Next, the shaping device 150 takes on a wrapping-around configuration, in which the product is contained in a compartment corresponding to the dimensions of the box being wrapped around.

As already mentioned, the apparatus 100 comprises a shaping device 150, on which a box is shaped by an operation of wrapping a blank, globally indicated by 200, around the product to be packaged.

In particular, the blank 200 is of the three-row type, with one row of central panels, adapted to constitute the side walls of the box, and two respective side rows of closing flaps protruding from the borders of the panels, adapted to form the end walls of the box.

In the central row, a connecting flap is also provided that protrudes from one end border of the blank 200 and that is intended to be connected to the opposite border.

The shaping device 150 comprises a substantially carousel structure in which an annular path is defined, constituting a closed and substantially circular trajectory, due to the fact that it is determined by a rotating carousel, lying on a shaping plane, on which one or more shaping supports 151, in particular a plurality thereof, are conveyed, moving in a substantially continuous motion, remaining spaced apart from each other by a substantially constant spacing.

Each of the shaping supports 151 is arranged to receive a product to be packaged, and the boxes are thereby shaped by wrapping around said blank 200 onto each of said supports 151, while they, and hence the respective contents to be packaged, already deposited on them by the inlet transfer device 130, move along a portion of said closed circular trajectory, which constitutes a box-shaping path.

This shaping path is arranged on a shaping plane, defined by said path that is annular and coplanar to the transport plane 120, which is arranged substantially horizontally.

The apparatus 100 comprises a blank insertion device 170 which provides a respective blank 200 at a respective shaping support 151 in which the product to be packaged has been transferred.

The device 170 for inserting blanks 200 is structured as a carousel: it comprises a respective second base 171, a respective second upright 172 extending vertically from said base 171 and having, at its top, a respective second rotating element 173 substantially disc-shaped, from which respective jointed insertion arms 174 branch off, which in turn have, on a respective distal operating end thereof, a blank pick-up and release device 175.

The insertion arms 174 have a jointed proximal end 176, which is connected to the second rotating element 173, and suitable movement members, associated with the second rotating element 173, so that the arm 174 may protrude with an inclination that may be varied with respect to the radial direction.

Moreover, it may vary its extension by stretching and shortening, so that the planetary motion of each pick-up and release device 175 is complex and only approximately circular. The respective blank pick-up and release device 175 finally has special movement elements to rotate around a vertical axis.

In this regard, the blank pick-up and release device 175 comprises a manoeuvring shaft 169 which is connected to said proximal end 176, and which is in turn connected to a flat frame 177 comprising in particular a number of gripping suction cups 178 adapted to adhere to a first blank surface, substantially forming a gripping quadrilateral.

The flat frame 177 is capable of being rotated with respect to the manoeuvring shaft 169, so that a second blank surface, which corresponds to the inner face, i.e. the face of the blank intended to constitute the inner surface of the box, may be inclined with respect to the configuration tangential to the circular path which is determined by the insertion device 170. This makes it possible to carry out operations that will be described hereinafter.

The rotation of the rotating element 173 and the movements of the insertion arms 174 make the pick-up and release devices 175 follow a closed path with deviations for picking up and releasing the blank 200.

In addition, the apparatus 100 comprises a device 180 for dispensing blanks, provided in a blank magazine which, in the present embodiment, comprises a stack 181 of blanks 200 which is fed by a blank conveyor 182 suitably fed upstream.

A blank dispenser device refers to any device capable of providing a succession of individual blanks to a subsequent operating station. This type of devices may include slides and carriages that support and move stacks of blanks, possibly all arranged with the same exposed face.

A blank pick-up and release device refers to any device that picks up a single blank from a dispenser device, and may therefore comprise separators and extractors of blanks from a horizontal or vertical stack of blanks, and a transport system that may comprise movable grippers or suction cups mounted on a handling system.

A blank transfer device, on the other hand, refers to any device that transfers individual blanks in an orderly succession and with a predefined distance from a starting position to an insertion position in a subsequent operating station. This type of device may comprise robotic arms with suction cups and/or grippers at the operating ends.

In the stack 181, the blanks 200 are arranged in a substantially vertical position and show externally, at the end of the stack 181 proximal to the insertion device 170, said first blank surface which is intended to be the outer surface of a corresponding box.

In this regard, the insertion arm 174 is capable of moving the pick-up and release device 175 closer to and away from the stack 181, relative to the main motion of the pick-up and release device 175 which is circular. In turn, as the blanks 200 are picked up, the stack 181 is translated in the direction of the insertion device 170 so that the position of the following blank to be picked up is always approximately the same.

In the present embodiment, the flat frame 177 comprises four gripping suction cups 178 which adhere at a position corresponding to each of the corners of the blank 200, which is substantially rectangular in shape with some flaps protruding from the borders.

Once extracted from the stack 181, the blank 200 is moved along an insertion path extending from stack 181 to an insertion area of the blank 200 in the shaping device 150, i.e. in the aforesaid box shaping path.

The shape of the trajectory of the pick-up and release devices 175 along their path is curvilinear, only approximately circular, with a second surface of the blank opposite to said first surface, which is positioned on the extrados of the trajectory. Along the entire path, and in particular at the insertion of the blank 200 into the shaping device 150, it is retained in a vertical position.

The insertion device 170, at an intermediate position in the insertion path between the blank stack 181 and an area for inserting the blank, thus comprises a deposition device 179 which deposits, on said second blank surface, i.e. on its inner face, at least one deposition of adhesive material, positioned on a protruding flap of the blank 200, intended to be adhered to a wall of the box at the end of the shaping by wrapping-around, i.e. in the step of shaping and closing the box.

A deposition device refers for instance to a gun with a nozzle that delivers a predefined amount of glue.

In particular, the protruding flap, on which the adhesive is deposited, is formed by said connecting flap, which, in this embodiment, is maintained at the end border of the blank 200, which is positioned at the top, i.e. at the top of the vertical configuration in which the blank 200 is retained.

The connecting flap consists of a foldable flap adapted to be adhered to the inner surface of the blank 200, at an opposite border which, looking at the vertical position in which the blank 200 is held in the pick-up and release device 175, is the lower border.

It must also be noted that when the blank 200 is provided to the insertion device 170, it has already been provided with special main folding lines which, looking at the vertical position in which the blank 200 is held in the pick-up and release device 175, extend in a horizontal direction.

Similarly, the blank 200 has vertical secondary folding lines, separating the panels of its central portion from the side flaps.

At the insertion area of the blank 200, the pick-up and release device 175 follows a motion resulting from the combination of its rotation about a vertical axis, the inclination of the respective arm 174 with respect to a radial direction and an elongation of the arm itself, so that the blank 200 is inserted into the shaping path with the two inner and outer surfaces of the blank substantially perpendicular to the trajectory of the shaping supports 151.

It is understood that the passage of the shaping supports 151 and the insertion of the blanks 200 is synchronised, so that the shaping support 151, with the content to be packed on board, comes into contact with the inner surface of the blank 200 substantially at a centreline area thereof, causing it to fold as it advances.

In this embodiment of the apparatus 100, the shaping support 151 comprises an extractable wrapping-around mandrel 154 comprising abutment walls on which the box walls are adhered in a predetermined position, forming predetermined angles with the other box walls, for example angles of 90° or more complex shapes determined by the abutment walls.

The product to be packaged is deposited inside the mandrel 154, where a compartment 155 is formed to accommodate it, so that the box may be formed by wrapping it around, leaving the opposite sides of the top of the box open.

The mandrel 154 is made from a first frame element 156 which is fixed to a first movable piece of equipment 157, and a second frame element 158 which is fixed to a second movable piece of equipment 159, the first and second pieces of equipment 157, 159 are in turn mounted on a base plate 60 on which respective screw shafts 61 are arranged intended for handling the movable equipment 157, 159 and the frame elements 156, 158 which have, each one, a half-tray 62 and angular bars 63.

A frame element 156, 158 refers to a rectilinear profile that provides an abutment around which a blank is wrapped.

In each frame element 156, 158, the half-tray 62 and angular bars 63 delimit a portion of the compartment 155 defining the angular abutments on which the panels of the blank 200 are intended to be folded.

The two frame elements 156, 158 composing the mandrel 154 may be reciprocally moved away or brought closer to each other: in a first, close configuration, the respective half-trays form a support surface arranged to receive the product to be packaged, while the angular bars 63, together with the edges of the half-trays 63 take on a wrapping-around position, around which the box is wrapped.

In a second configuration, the frame elements 157, 159 move away from each other, thereby extracting the mandrel 154 from the box when it has been fully wrapped and assembled, joining the connecting flap to the respective side panel.

The mandrel 154 may thereby be extracted from at least one open end of said box, i.e. from both ends in the present embodiment, at the end of said shaping path.

When the shaping support 151 receives the product to be packaged in the compartment 155, the two frame elements 156, 158 composing the mandrel 154 are in a close configuration, and remain so for the entire shaping path, i.e. until the box is assembled. At that stage, upon extraction thereof the box and the product contained therein are left on the annular conveyor of the shaping device 150.

The shaping support 151 comprises, at each frame element 156, 158, a respective pushing element 64 which moves together with the half-tray 62: it performs the task of pushing and moving the product to be packaged which has already been laid in the compartment 155 by arranging it in the middle of the support plane determined by the half-trays 62 approaching.

A pushing element refers to a movable transverse bar or plate mounted on a rod that moves it back and forth.

The pushing elements 64 increase and reduce the dimensions of the compartment 155 that receives the product to be packaged, from an enlarged configuration, wherein the product to be packaged is laid inside the mandrel 154, to a wrapping-around configuration, wherein the mandrel 154 takes the dimensions of the box to be shaped.

In this respect, the pushing elements 64 could be operated independently of the frame elements 156, 158.

The impact between the blank 200 and the shaping support 151 takes place in such a way that the edges of the half-trays 62 and the folding bars 63 touch the folding lines that have been arranged in the blank to separate its side panels, and this makes the two opposite side panels tilt and move closer to each other, while the shaping support 151 moves along its path.

The shaping device 150 comprises, at this point of the path, a fixed pocket 70 formed by a sliding plane 71 and an upper guide plate 72 forming a funnel-shaped structure traversed by the shaping support 151 in its continuous motion.

In this regard, the pocket 70 has an inlet end and an outlet end, both of them open, and is traversed by said shaping support 151 to carry out the folding of the blank 200.

The interaction between the tilted panels and the pocket makes them fold, and brings the panel which has to be connected to the connecting flap in a position where, as it rotates, it forms a quadrilateral configuration with the other panels.

Once the two portions of the blanks 200, which are adapted to form the two opposite walls of the box, have been knocked down to make them adhere to the shaping support 151, the semi-finished box and the content to be packaged enter an area of the shaping path.

Finally, the shaping support 151 comprises a folding element 90, integral with said carousel, which is movable from a retracted position to an operating position wherein it interferes with a connecting flap of the blank, folding it. The movement is determined by a specific dedicated servomotor.

The folding element 90 is formed by a bar that moves to interfere with the connecting flap so as to give it a predetermined folding.

Once the walls have been arranged in the respective target positions, the wrapped-around box, with the content to be packaged therein, exits the area where the box is shaped, in its tubular form, before the ends are closed.

By exploiting the still open ends of the box, the mandrel 154 may be extracted from the box, leaving the content to be packaged in place, before the box is transferred to an outlet conveyor plane. Once this extraction is complete, the box rests on the shaping support and finishes its shaping path.

The packaging apparatus 100 comprises, at this point, a second transfer device 190 that acts as an outlet transfer device, to transfer the box from the shaping plane to an outlet conveyor plane, also arranged horizontally.

In fact, the second transfer device 190 is arranged to pick up a box, with the respective content to be packaged therein, moving on the shaping plane, in order to transfer it from there to a second transport device 115, consisting of a rectilinear conveyor belt.

The second transport device 115 thus defines a trajectory, followed by each box, which constitutes a rectilinear and horizontally arranged outlet/outward path, of the wrapped-around box with the content to be packaged therein.

The outlet shaping device 190 is structured as a carousel: it comprises a third base 191, a third upright 192 extending vertically from said base 191 and having, on its top, a third rotating element 193 substantially disc-shaped, from which respective second articulated transfer arms 194 branch off, which in turn have, on one respective distal operating end thereof, a second gripping device 195 which may be of the suction cup, gripper, or mixed type.

The second gripping devices 195 therefore move with a closed trajectory around their own third shaft 192.

Once released from its box, the shaping support 151 keeps on travelling along the annular path of the training device, thus covering a return portion of the annular path.

The shaping support 151 comprises a mandrel 154 lift mechanism 153 which is made to revolve around by the carousel shaping device 150, thus travelling the entire closed circular trajectory.

The function of the lift mechanism 153 is to lower the height of the mandrel 154, in the return portion, and to raise it at the end of the shaping path wherein the product to be packaged is laid, so that, when the shaping support 151 receives the respective product to be packaged from the first transfer device 130, it ascends to a shaping level that corresponds to said shaping plane, i.e. to the working plane, thereby reducing any form of stress on the product to be packaged which does not collide with or fall onto the target area of the shaping support 151.

In addition, when the box is transferred to the outlet transfer device 190, the lift mechanism 153 lowers the mandrel 153 to a lower level.

The lift mechanism 153 comprises, on each sidewall of the shaping device, a pair of cranks 210 transversally connected in pairs by an actuator shaft 211, which is in turn connected to a suitable servomotor. The cranks 210 are jointed to lifting rods 212 connected, on each side, to a respective half-tray 62 and the corresponding frame elements 156, 158 of the mandrel 154.

Thanks to the mechanism described above, the shaping device 150 has a section, that corresponds to said return portion, wherein the shaping support 151 follows a path in which, at the end of the shaping plane, it descends to a lower level and subsequently ascends again to the level of the shaping plane at an entrance thereof, receiving said content to be packaged in the ascent.

In addition, during its ascent, the shaping support 151, which otherwise moves across the shaping plane at a predetermined and substantially constant shaping rate, is slowed down to couple with said content to be packaged.

Note how the descending and ascending movement is facilitated by the fact that the frame elements 157, 159 are in a configuration in which they are moved away from each other, so they do not interfere with the sliding plane 71 which, in the present example, is connected to an annular beam that provides support to the shaping supports on their path into the shaping device 150.

This ensures that the transport from the inlet transfer plane to the shaping plane and from the shaping plane to the outlet transport plane take place on the inlet transfer plane and the outlet transfer plan coplanar to the said transport planes and shaping planes.

A person skilled in the art may make several further modifications and variations to the above-described apparatus and process for shaping a box by wrapping-around, in order to meet additional and contingent requirements, all of which fall, however, within the scope of protection of the present solution as defined by the attached claims.

The invention claimed is:

1. An apparatus for shaping a box by wrapping-around, comprising:

a shaping device comprising a carousel, said carousel comprising one or more shaping supports arranged to circulate along a closed circular trajectory, a portion of the closed circular trajectory comprising a shaping path of said box, a dispenser device for dispensing blanks, and a transfer device for transferring blanks;

wherein:

said carousel is configured to rotate about a vertical rotation axis in a continuous motion, said one or more shaping supports are configured to receive one or more products to be packaged, and said blanks are configured to be wrapped around the one or more shaping supports to contain said one or more products to be packaged, and said transfer device is configured to sequentially pick up the blanks from a magazine, transport the blanks along a curvilinear path, and insert the blanks, one at a time, into said shaping path in a vertical position, said transfer device further configured to rotate the blanks at an end of the curvilinear path such that an inner face of the blanks are substantially perpendicular to said shaping path when inserted into the shaping path, and a respective shaping support of the one or more shaping supports is. configured to intercept one blank of said blanks, engaging the inner face of said one blank, in a position intersecting the shaping path.

2. The apparatus for shaping a box by wrapping-around according to claim 1, wherein the shaping path is arranged on a substantially horizontal shaping plane, and the apparatus is configured to retain the blank, in the position to intersect the shaping path, in a vertical position.

3. The apparatus for shaping a box by wrapping-around according to claim 1, said transfer device comprising a rotating element, arranged on a top of a column, the rotating element comprising a rotating head and one or more arms extending from said rotating head and configured to revolve around by said rotating head, each arm of the one or more arms comprising a pick-up and release device to grasp, from a magazine, a respective blank having an outer face, on which the pick-up and release device is configured to act, and an inner face.

4. The apparatus for shaping a box by wrapping-around according to claim 3, wherein said pick-up and release device is configured to rotate about a vertical axis with respect to said arm, to insert the respective blank in the shaping path.

5. The apparatus for shaping a box by wrapping-around according to claim 3, said transfer device further comprising a deposition device configured to apply adhesive material on said inner face, said adhesive material arranged between said magazine and said position intersecting the shaping path.

6. The apparatus for shaping a box by wrapping-around according to claim 1, the shaping device further comprising a fixed pocket, the fixed pocket having an open inlet end and an open outlet end, traversed by one of the one or more shaping supports configured for folding said one blank.

7. The apparatus for shaping a box by wrapping-around according to claim 1, the shaping support further comprising a folding element movable from a retracted position to an operating position in which said folding element interferes with and bends a connecting flap of said one blank.

8. The apparatus for shaping a box by wrapping-around according to claim 1, the shaping support further comprising at least one pushing element for acting on said one or more products to be packaged to position said one or more products to be packaged in a middle of the shaping support.

9. The apparatus for shaping a box by wrapping-around according to claim 1, the shaping support further comprising a wrapping-around mandrel, said wrapping-around mandrel configured to be extracted from at least one open end of said box at an end of said shaping path.

10. The apparatus for shaping a box by wrapping-around according to claim 9, the wrapping-around mandrel comprising two frame elements, said two frame elements each configured to be extracted from the at least one open end of said box.

11. A process for shaping a box by wrapping-around, wherein a blank is wrapped around a content to be packaged, comprising the steps of:

(a) providing one or more shaping supports configured to receive one or more products to be packaged, wherein said one or more shaping supports continuously move around an annular path about a vertical axis, a portion of said annular path comprising a box shaping path;

(b) transferring said one or more products to be packaged onto a respective shaping support;

(c) transferring said blank from a magazine along a curvilinear path;

(d) rotating the blank at an end of said curvilinear path so that an inner face of said blank is placed substantially perpendicular to the shaping path;

(e) inserting the rotated blank into the box shaping path, in a vertical position, after said one or more products to be packaged have been transferred onto the respective shaping support, said box shaping path perpendicularly interfering with the inner face of said blank, wherein said transferring said blank, said rotating the blank, and said inserting the blank is carried out by a transfer device; and (g) wrapping said blank around said one or more products to be packaged.

12. The process for shaping a box by wrapping-around according to claim 11, wherein:

the box shaping path lies on a plane that is arranged horizontally, the one or more shaping supports revolve around a vertical axis of revolution perpendicular to the plane that is arranged horizontally, and during the inserting, the blank is kept in a vertical position.

13. The process for shaping a box by wrapping-around according to claim 11, further comprising before the inserting:

(c1) taking said blank from the magazine in a vertical position, (c2) travelling the blank along the curvilinear path along which the inner face of the blank is exposed on an extrados of said curvilinear path, and (c3) receiving a deposition of adhesive material on said blank.

14. The process for shaping a box by wrapping-around according to claim 11, further comprising after the insertion:

(f) folding the blank in a pocket comprising an inlet end and an outlet end, the pocket being traversed by said shaping support.

* * * * *